(12) United States Patent
Tsuchiya et al.

(10) Patent No.: US 12,686,326 B2
(45) Date of Patent: Jul. 21, 2026

(54) VEHICLE LIGHTING DEVICE, VEHICLE LIGHTING CONTROL METHOD, AND STORAGE MEDIUM

(71) Applicant: HONDA MOTOR CO., LTD., Tokyo (JP)

(72) Inventors: Yuji Tsuchiya, Wako (JP); Tsuyoshi Takamoto, Wako (JP); Kazuyuki Kawamura, Wako (JP); Akihiro Kageyu, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 98 days.

(21) Appl. No.: 18/789,734

(22) Filed: Jul. 31, 2024

(65) Prior Publication Data

US 2025/0108751 A1 Apr. 3, 2025

(30) Foreign Application Priority Data

Sep. 29, 2023 (JP) ................................. 2023-169686

(51) Int. Cl.
B60Q 1/18 (2006.01)
H05B 47/115 (2020.01)

(52) U.S. Cl.
CPC .............. B60Q 1/18 (2013.01); H05B 47/115 (2020.01); B60Q 2300/20 (2013.01); B60Q 2300/336 (2013.01)

(58) Field of Classification Search
CPC ........ H05B 47/10; H05B 47/115; B60Q 1/08; B60Q 1/085; B60Q 1/18; B60Q 1/346; B60Q 1/442; B60Q 1/543; B60Q 2300/45; B60Q 2400/00; B60Q 2400/40
See application file for complete search history.

(56) References Cited

U.S. PATENT DOCUMENTS

| | | | | |
|---|---|---|---|---|
| 2019/0168664 A1* | 6/2019 | Tatara | .................... | B60Q 1/445 |
| 2019/0315271 A1* | 10/2019 | Tatara | ................. | G05D 1/0276 |
| 2020/0114812 A1* | 4/2020 | Imaishi | ................. | B60Q 1/346 |

(Continued)

FOREIGN PATENT DOCUMENTS

| | | | |
|---|---|---|---|
| JP | 2009-040227 | | 2/2009 |
| JP | 2009040227 A | * | 2/2009 |
| JP | 2011-084106 | | 4/2011 |

(Continued)

OTHER PUBLICATIONS

Japanese Office Action for Japanese Patent Application No. 2023-169686 mailed Dec. 3, 2024.

*Primary Examiner* — Thai Pham
(74) *Attorney, Agent, or Firm* — Amin, Turocy & Watson, LLP

(57) ABSTRACT

A vehicle lighting device includes a first exterior light that is provided on an exterior portion of a vehicle, a second exterior light that is provided on the exterior portion of the vehicle, a recognition unit configured to recognize an object present on a travel route of the vehicle, a detection unit configured to detect a visual recognition direction of a driver of the vehicle, and a control unit configured to operate the second exterior light when the object is recognized by the recognition unit, and to operate the first exterior light according to the visual recognition direction detected by the detection unit.

8 Claims, 22 Drawing Sheets

(56) References Cited

U.S. PATENT DOCUMENTS

| | | | |
|---|---|---|---|
| 2020/0223351 A1* | 7/2020 | Uchida | .................. B60Q 1/525 |
| 2023/0249604 A1* | 8/2023 | Takori | ..................... B60Q 1/04 |
| | | | 340/468 |

FOREIGN PATENT DOCUMENTS

| | | |
|---|---|---|
| JP | 2018-069800 | 5/2018 |
| JP | 2018069800 A * | 5/2018 |
| WO | 2018/021063 | 2/2018 |

* cited by examiner

VEHICLE LIGHTING DEVICE, VEHICLE LIGHTING CONTROL METHOD, AND STORAGE MEDIUM

CROSS-REFERENCE TO RELATED APPLICATION

Priority is claimed on Japanese Patent Application No. 2023-169686, filed Sep. 29, 2023, the content of which is incorporated herein by reference.

BACKGROUND

Field of the Invention

The present invention relates to a vehicle lighting device, a vehicle lighting control method, and a storage medium.

Description of Related Art

In general, lights other than turn signals provided at the front and rear of a vehicle are used to ensure forward field of view at night or to inform following vehicles of a vehicle position. In recent years, technologies have been proposed that give the lighting devices described above a notification function with respect to pedestrians, and the like, in addition to their conventional roles to further ensure the safety of vehicles and pedestrians.

For example, a vehicle lighting device (a vehicle lighting system) has been proposed that can inform a pedestrian that a vehicle traveling in an automated driving mode has recognized the pedestrian (PCT International Publication No. WO2018/021063). This device includes a communication lamp that is visible from in front of the vehicle, and a lighting control device that changes the lighting state of the communication lamp when the vehicle detects a pedestrian.

However, in the conventional technology described above, although the vehicle itself notifies other parties (pedestrians) whether it has recognized them, it is not possible to reflect whether the driver has recognized other parties, or whether the vehicle system has recognized the pedestrian. For this reason, comprehensive communication with other parties is not possible, and there is room for improvement in ensuring traffic safety for the vehicle and pedestrians.

The present invention has been made in consideration of such circumstances, and one of its objects is to provide a vehicle lighting device, a vehicle lighting control method, and a storage medium that can achieve comprehensive communication with other parties, and further improve traffic safety for the vehicle and other parties to contribute to the development of a sustainable transportation system.

SUMMARY OF THE INVENTION

The vehicle lighting device, the vehicle lighting control method, and the storage medium of the present invention have adopted the following configuration.

(1): A vehicle lighting device according to a first aspect of the present invention includes a first exterior light that is provided on an exterior portion of a vehicle, a second exterior light that is provided on the exterior portion of the vehicle, a recognition unit configured to recognize an object present on a travel route of the vehicle, a detection unit configured to detect a visual recognition direction of a driver of the vehicle, and a control unit configured to operate the second exterior light when the object is recognized by the recognition unit, and to operate the first exterior light according to the visual recognition direction detected by the detection unit.

(2): In the aspect of (1) described above, the control unit may operate the second exterior light when the vehicle stops in front of an intersection or a crosswalk, and the recognition unit may recognize the object, and operate the first exterior light according to the visual recognition direction detected by the detection unit.

(3): In the aspect of (1) described above, the first exterior light may be provided along an outer edge of a side of the vehicle, and the second exterior light may be provided at a right front of the vehicle in a vehicle width direction.

(4): In the aspect of (1) described above, the control unit may turn on the second exterior light to follow the object.

(5): In the aspect of (1) described above, the control unit may turn on positions of the second exterior light corresponding to a plurality of objects when the plurality of objects are recognized.

(6): In the aspect of (1) described above, the control unit may change a form of lighting the second exterior light according to a positional relationship of the vehicle and each of the plurality of objects.

(7): A vehicle lighting control method according to another aspect of the present invention includes, by a processor of a vehicle lighting device that includes a first exterior light provided on an exterior portion of a vehicle and a second exterior light provided on the exterior portion of the vehicle, processing of recognizing an object present on a travel route of the vehicle, processing of detecting a visual recognition direction of a driver of the vehicle, and processing of operating the second exterior light when the object is recognized and operating the first exterior light according to the detected visual recognition direction.

(8): A storage medium according to still another aspect of the present invention has stored a program for causing a processor of a vehicle lighting device that includes a first exterior light provided on an exterior portion of a vehicle and a second exterior light provided on the exterior portion of the vehicle to execute processing of recognizing an object present on a travel route of the vehicle, processing of detecting a visual recognition direction of a driver of the vehicle, and processing of operating the second exterior light when the object is recognized and operating the first exterior light according to the detected visual recognition direction.

According to the aspects (1) to (8), the vehicle lighting device controls each light according to the position of an object and a visual recognition direction of a driver, thereby enabling comprehensive communication with other parties, and further improving traffic safety for vehicles and other parties to contribute to the development of a sustainable transportation system.

DETAILED DESCRIPTION OF THE INVENTION

Hereinafter, embodiments of a vehicle lighting device, a vehicle lighting control method, and a storage medium of the present invention will be described with reference to the drawings.

A vehicle lighting device 1 is, for example, a lighting device mounted in a vehicle. Examples of a vehicle include a four-wheeled vehicle, a motorcycle, and a micro-mobile. In the following description, a case of a four-wheeled vehicle will be described. For example, when an object such as a pedestrian, a bicycle, a wheelchair, or livestock crosses a road on which the vehicle is traveling, the vehicle lighting device 1 operates to turn on a lighting in accordance with a movement of the object. For example, the vehicle lighting device 1 detects the object with a camera or the like, and further expresses the movement of the object by detecting a visual recognition direction of a driver of the vehicle.

Figure 1:
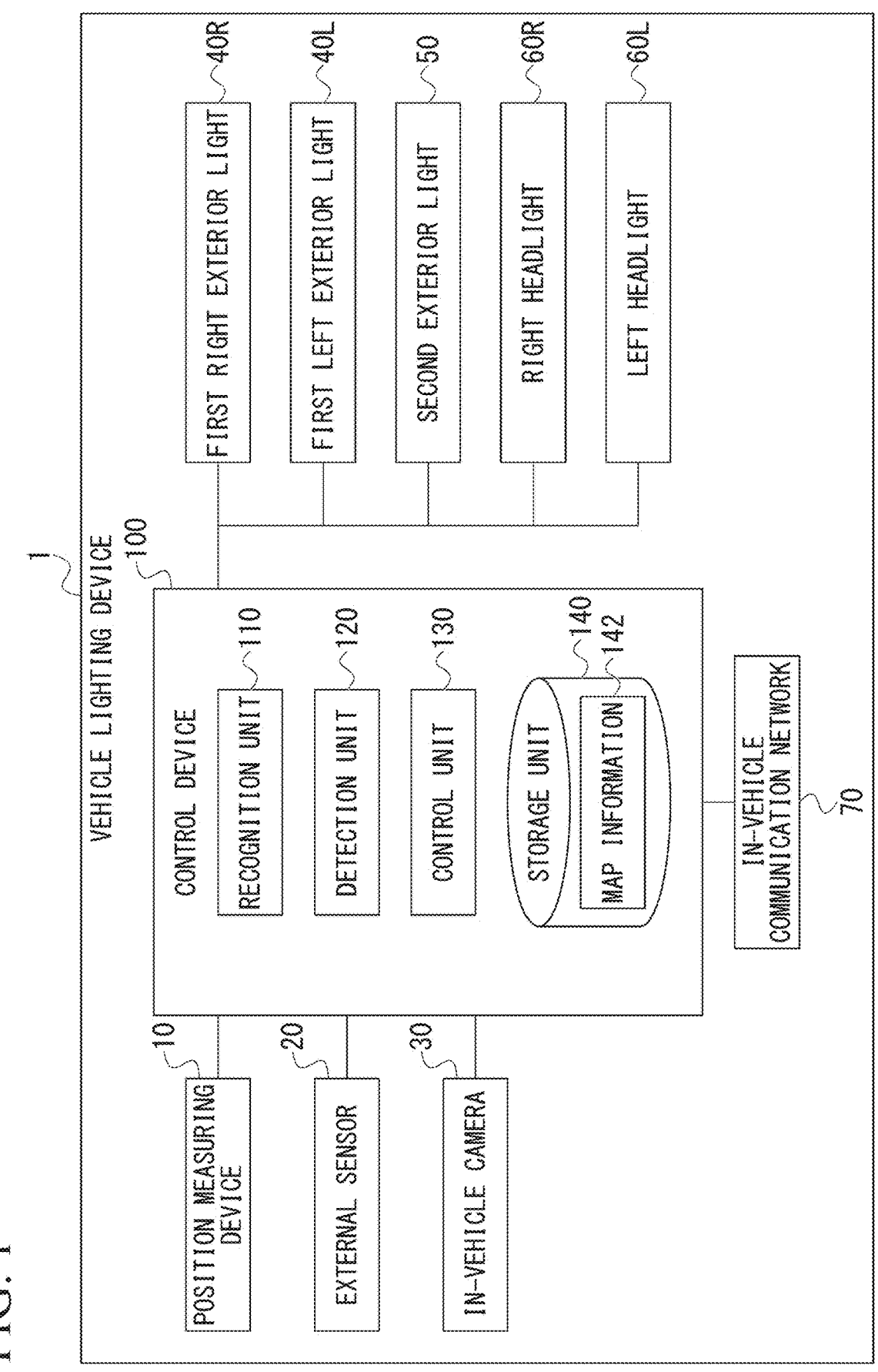
FIG. 1 is a configuration diagram of a vehicle lighting device.

FIG. 1 is a configuration diagram of the vehicle lighting device 1. The vehicle lighting device 1 includes, for example, a position measuring device 10, an external sensor 20, an in-vehicle camera 30, a first right exterior light 40R, a first left exterior light 40L, a second exterior light 50, a right headlight 60R, a left headlight 60L, an in-vehicle communication network 70, and a control device 100.

The position measuring device 10 is, for example, a global positioning system (GPS) receiver. The position measuring device 10 measures a position of the vehicle 200 and outputs the position to the control device 100.

The external sensor 20 is, for example, a camera, a radar device, a light detection and ranging (LIDAR), a sonar, or the like for acquiring information outside the vehicle. The external sensor 20 transmits a signal representing the detected information to the control device 100.

The in-vehicle camera 30 is, for example, a visible light camera. The in-vehicle camera 30 is provided in a passenger compartment 201 of the vehicle 200 and is set up to capture an image of a face of the driver.

Figure 2:
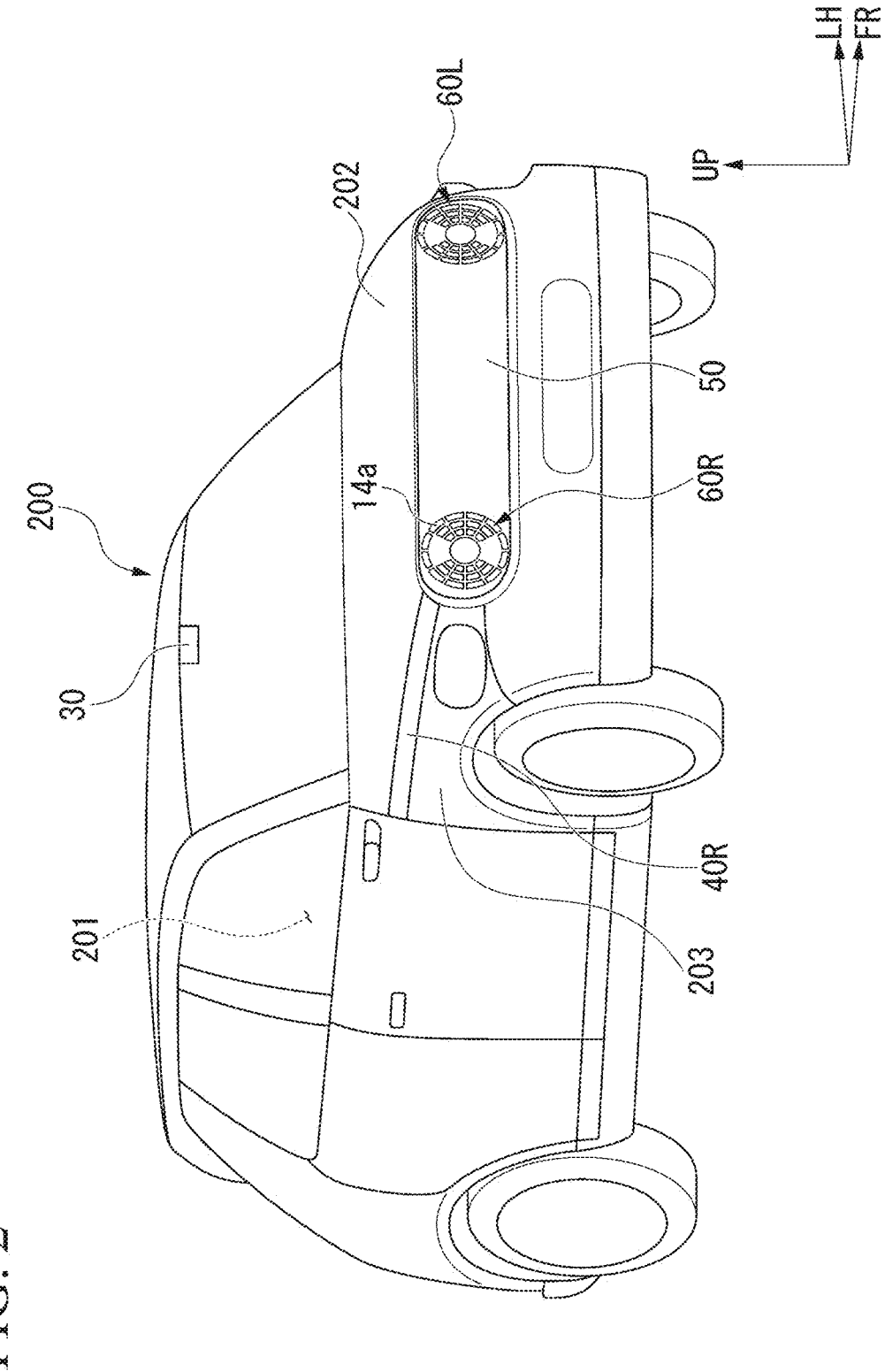
FIG. 2 is a perspective view of a vehicle equipped with the vehicle lighting device.

FIG. 2 is a perspective view of the vehicle 200 equipped with the vehicle lighting device 1. Each of the first right exterior light 40R and the first left exterior light 40L is a light-emitting device provided along an outer edge on a side of the vehicle 200. The first right exterior light 40R and the first left exterior light 40L are provided along a fender, for example. The first right exterior light 40R and the first left exterior light 40L are provided along a boundary between left and right bonnet hoods 202 and a front fender 203 of the vehicle 200. Operations of the first right exterior light 40R and the first left exterior light 40L are each controlled by the control device 100.

The second exterior light 50 is a light-emitting device that is provided at a right front of the vehicle 200 in a vehicle width direction. The second exterior light 50 is provided in, for example, the front grill that constitutes a front of the vehicle 200. The second exterior light 50 is provided between the right headlight 60R and the left headlight 60L to extend in the vehicle width direction.

The right headlight 60R and the left headlight 60L are provided on both left and right sides in the vehicle width direction at the front of the vehicle 200.

Figure 3:
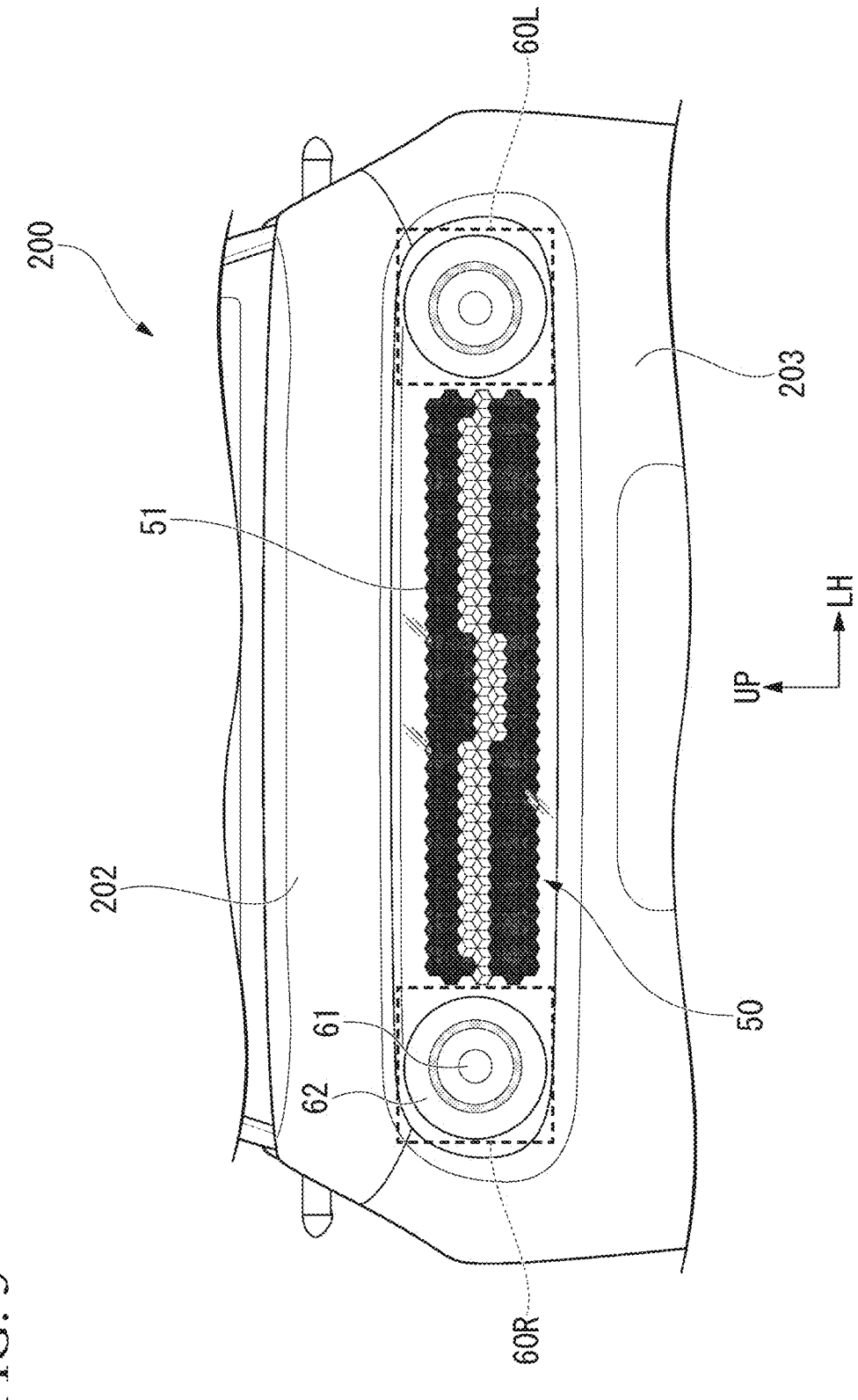
FIG. 3 is a front view of a second exterior light.

FIG. 3 is a front view of the second exterior light 50. The second exterior light 50 has a plurality of tube portions 51 that face the front of the vehicle 200 (a lighting display direction) and are arranged in a vertical direction and the vehicle width direction. In addition, each of the right headlight 60R and the left headlight 60L is constituted by a headlight body 61 and a plurality of state display lights 62 surrounding the headlight body 61. The headlight body 61 is a light with which the front is irradiated at night and the like. The plurality of state display lights 62 are disposed in a circular ring shape when viewed from the front. The state display lights 62 function as turn signals. The state display lights 62 are controlled to be turned on and off individually. In FIG. 2, the front of the vehicle 200 is indicated by an arrow FR. An upper side of the vehicle 200 is indicated by an arrow UP. A left side of the vehicle 200 when facing the front is indicated by an arrow LH.

Figure 4:
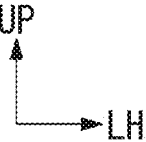
FIG. 4 is an enlarged view of the second exterior light.

FIG. 4 is an enlarged view of the second exterior light 50. Each tube portion 51 has a peripheral wall 52a formed in a hexagonal shape. The plurality of tube portions 51 are disposed in a staggered pattern in the vertical direction and the vehicle width direction. A Y-shaped connecting wall 53 connecting alternately spaced vertices 52*t* of the hexagonal peripheral wall 52*a* is provided on a front side (a lighting display direction side) of each tube portion 51. For this reason, the peripheral walls 52*a* of each tube portion 51 of a tube portion assembly wall form a continuous honeycomb shape. A light of a light source, which is turned on in this manner, is emitted to a front side of a vehicle through the tube portion 51 of the tube portion assembly wall. A visual recognizer outside the vehicle can recognize characters, figures, and the like, displayed by the light of the light source turned on inside the tube portion. When the light source is not turned on, the light source is hidden by the peripheral wall 52*a* of the tube portion 51, making it difficult to be viewed from the outside.

Figure 5:
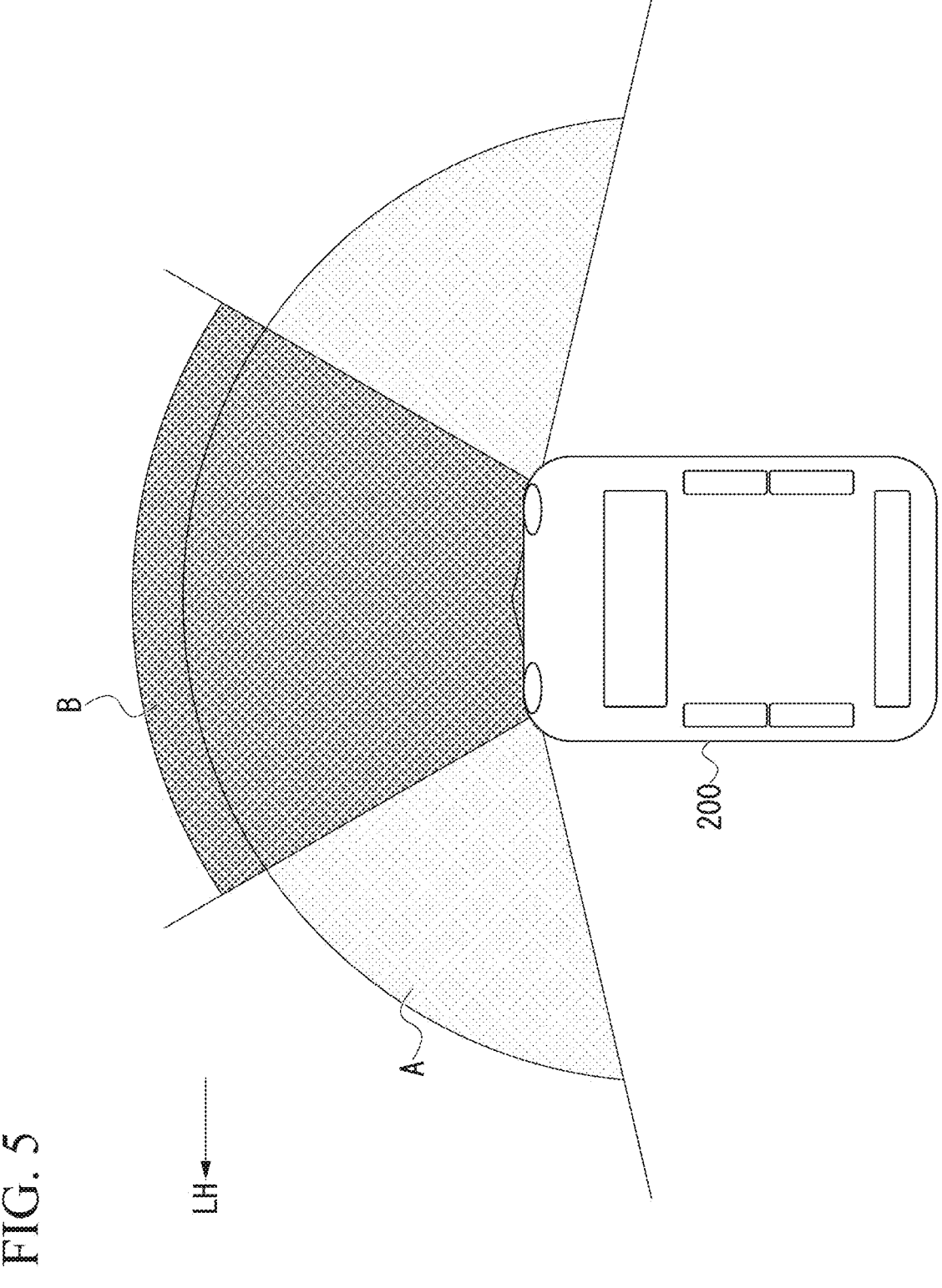
FIG. 5 is a diagram which shows a recognition range of an external sensor and a field of view range of a driver.

FIG. 5 is a diagram which shows a recognition range of the external sensor 20 and a field of view range of the driver. A shows the field of view range of the driver, and B shows the recognition range of the external sensor 20. In a vehicle to which the present invention is applied, a field of view A of the driver is wider than a recognition range B of the external sensor. As described below, when the vehicle 200 stops near an intersection or a crosswalk and an object such as a pedestrian or another vehicle is present in the recognition range B of the external sensor 20, the recognition unit 110 recognizes the object using the external sensor 20. When an object is present in the field of view range A of the driver and outside the recognition range of the external sensor 20, the driver notices and stares at the object, and thereby the detection unit 120 detects a visual recognition direction of the driver using the in-vehicle camera 30 and estimates that the object is present.

As shown in FIG. 1, the control device 100 includes, for example, a recognition unit 110, a detection unit 120, a control unit 130, and a storage unit 140. Components other than the storage unit 140 are realized by, for example, a hardware processor such as a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in advance in a storage device such as a hard disk drive (HDD) or a flash memory (a storage device with a non-transient storage medium), or may be stored in a removable storage medium such as a DVD or CD-ROM (a non-transient storage medium), and may be installed by the storage medium being attached to a drive device.

The recognition unit 110 recognizes an object. The recognition unit 110 recognizes an object present on the travel route of the vehicle 200 on the basis of information input from the external sensor 20. For example, the recognition unit 110 inputs an image captured by a camera into a trained model for recognizing an object, thereby recognizing a position of the object on the image, and converts the position into a position on a virtual plane viewed from the sky, thereby recognizes an object present on the travel route of the vehicle 200. The recognition unit 110 transmits the recognized recognition information to the control unit 130. The recognition information is, for example, position information of the recognized object.

The detection unit 120 detects the visual recognition direction of the driver using the in-vehicle camera 30. The visual recognition direction is, for example, a direction in which a line of sight of the driver of the vehicle 200 faces. The visual recognition direction is not limited to a direction in which the driver is starting, and may also be a direction in which the driver is staring vaguely. The detection unit 120 detects the visual recognition direction of the driver using, for example, a corneal reflection method in which infrared rays are reflected by a cornea of the driver to detect the line of sight of the driver, a limbus tracking method that uses a difference in light reflectance between the cornea and the sclera, and an image analysis method in which an image of the eyeball is captured by a camera and the line of sight is detected by image processing.

The detection unit 120, for example, captures eyes of the driver using the in-vehicle camera 30 and detects the visual recognition direction from a positional relationship between an inner corner of the eye and the iris. The detection unit 120 measures an elapsed time when a movement of the visual recognition direction stops. When the detection unit 120 detects that the visual recognition direction of the driver is facing the same direction (within a predetermined angle range) for a certain period of time, it transmits the direction as the visual recognition direction (detection information) to the control unit 130.

The control unit 130 controls the first right exterior light 40R, the first left exterior light 40L, the second exterior light 50, the right headlight 60R, and the left headlight 60L on the basis of the recognition information and the detection information transmitted from the recognition unit 110 and the detection unit 120, a driving situation of the vehicle 200, and information on a scene in which the vehicle is placed. The driving situation is, for example, information indicating that the vehicle 200 is traveling, stopped, or about to turn right or left.

The driving situation is acquired from, for example, the in-vehicle communication network 70. The in-vehicle communication network 70 is, for example, a controller area network (CAN). The in-vehicle communication network 70 is connected to a sensor and an electronic control unit (ECU) of the vehicle 200, and transmits various types of state information used for vehicle control.

The scene is information indicating whether the vehicle 200 is at an intersection or a crosswalk. The control unit 130 determines the scene by comparing a history of position information of the vehicle 200 measured by the position measuring device 10 with information of map information 142 stored in the storage unit 140.

The storage unit 140 stores the map information 142. The map information 142 stores the latest map as appropriate, and stores a location of the intersection or crosswalk. The storage unit 140 may be realized by the various types of storage devices, or an electrically erasable programmable read only memory (EEPROM), a read only memory (ROM), a random access memory (RAM), or the like.

In addition, the recognition unit 110 may recognize a presence of an object in a vicinity of the vehicle 200 according to communication with a mobile terminal of a pedestrian or other vehicles as well as recognize the object by the external sensor 20.

When the recognition unit 110 recognizes an object, the control unit 130 operates the second exterior light 50, the right headlight 60R, and the left headlight 60L. The control unit 130 may also operate the second exterior light 50 on the basis of the visual recognition direction of the driver detected by the detection unit 120. On the other hand, the control unit 130 operates the first right exterior light 40R and the first left exterior light 40L on the basis of the visual recognition direction of the driver detected by the detection unit 120. In addition, when the recognition unit 110 recognizes an object and the control unit 130 determines that the vehicle 200 is in front of an intersection or a crosswalk, each light may be operated. Lighting modes of the first right exterior light 40R, the first left exterior light 40L, the second exterior light 50, the right headlight 60R, and the left headlight 60L will be described in the following description.

Figure 6:
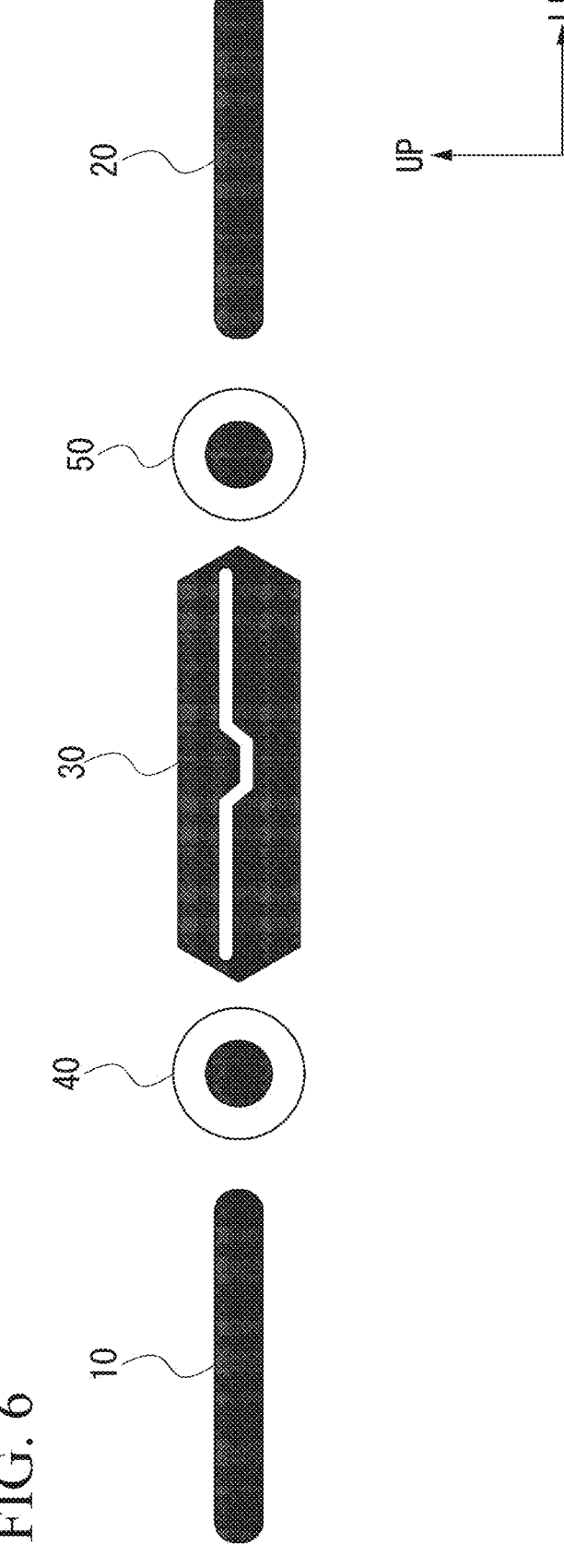
FIG. 6 is a diagram which shows an example of a lighting mode of each light when a vehicle is traveling.

FIG. 6 is a diagram which shows an example of the lighting mode of each light when the vehicle 200 is traveling. "Traveling" means traveling on a road in a direction of travel at a vehicle speed of a predetermined speed or higher. When the vehicle 200 is traveling, the control unit 130 turns off the first right exterior light 40R and the first left exterior light 40L. The control unit 130 turns on the second exterior light 50 to a single line. The control unit 130 turns off the headlight body 61 of the right headlight 60R and the left headlight 60L, and turns on the state display light 62. The lighting mode of each light shown in FIG. 6 is set to a first lighting mode. When the vehicle 200 is traveling normally on a road, the control unit 130 controls each light to the first lighting mode. The control unit 130 determines that the vehicle 200 is traveling normally by acquiring a driving situation from the in-vehicle communication network 70. For example, the control unit 130 determines that the vehicle 200 is traveling when a vehicle speed of the vehicle 200 is equal to or higher than a predetermined speed.

Figure 7:
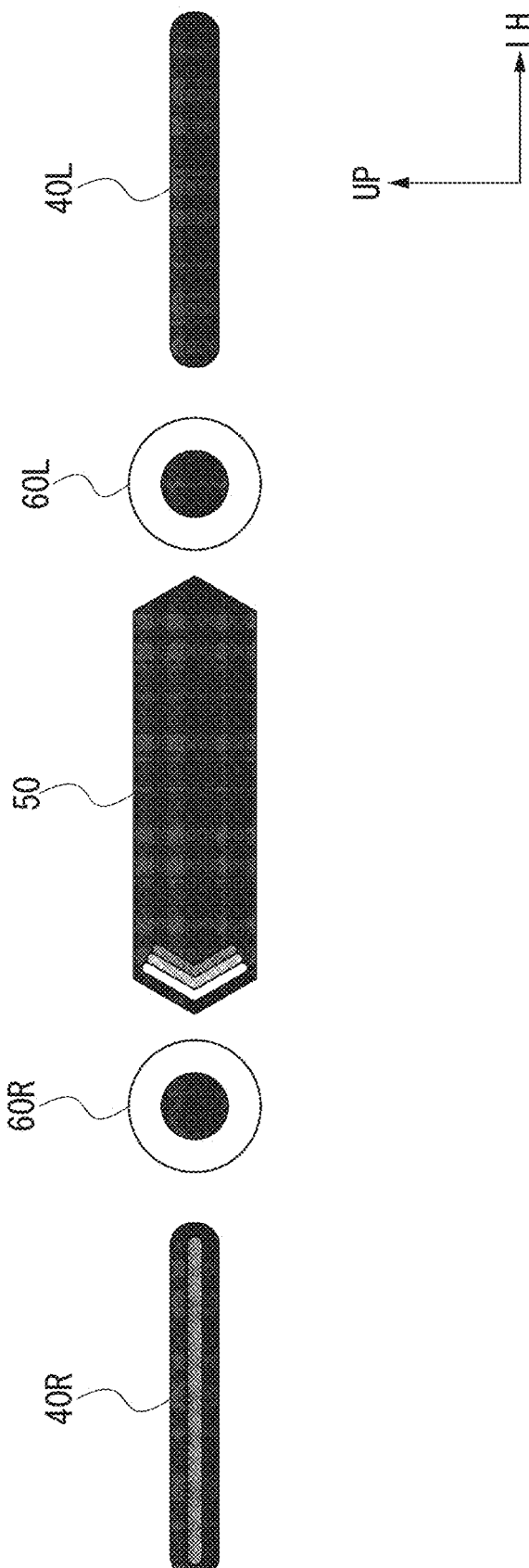
FIG. 7 is a diagram which shows an example of a lighting state of each light when a pedestrian begins to approach from a right side of the vehicle.
Figure 8:
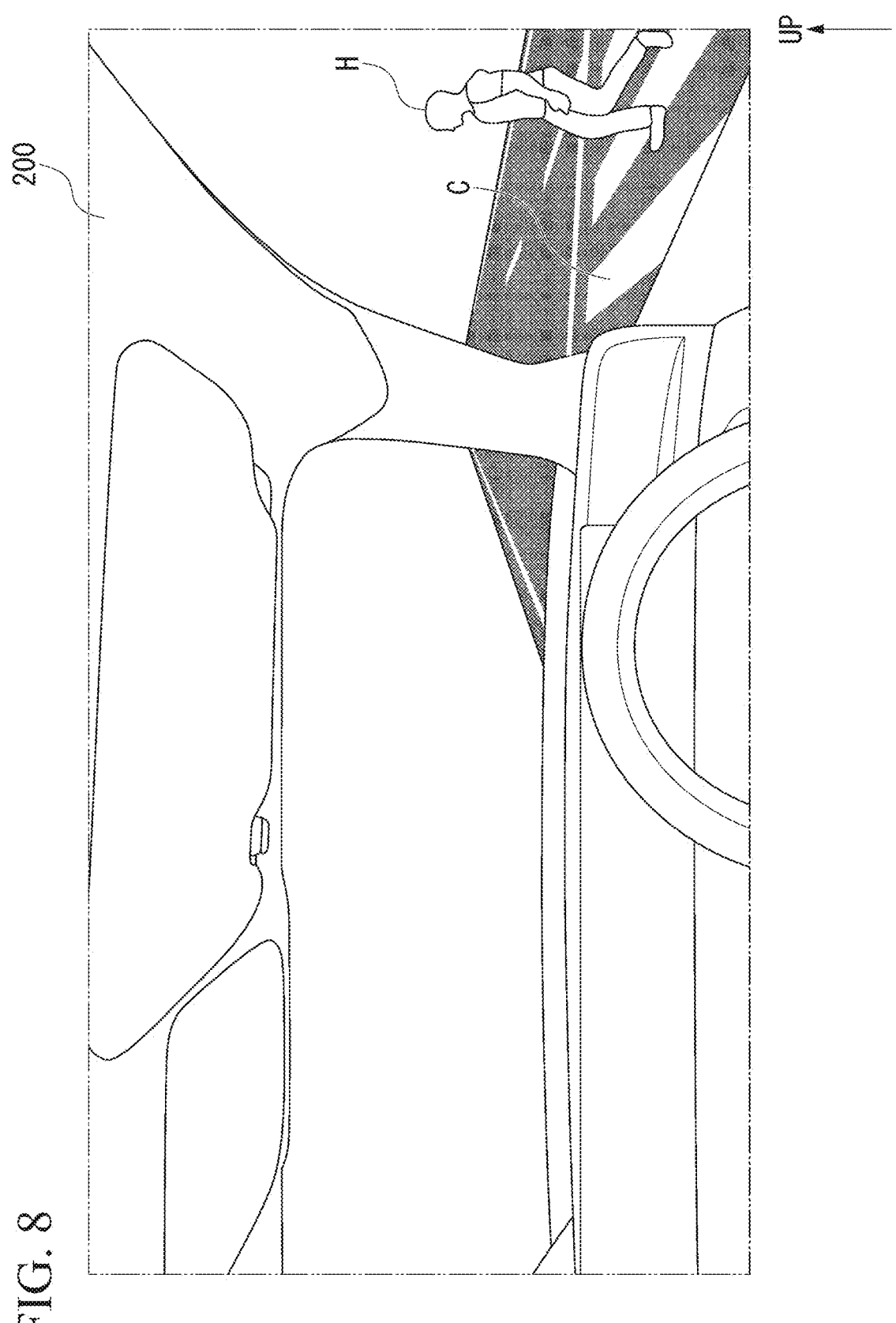
FIG. 8 is a diagram which shows an example of a pedestrian viewed from a viewpoint of a driver of the vehicle when each light is controlled to have the state shown in FIG. 7.

FIG. 7 is a diagram which shows an example of a lighting state of each light when a pedestrian begins to approach from a right side of the vehicle 200 while the vehicle 200 is turning right. FIG. 8 is a diagram which shows an example of a pedestrian H viewed from a viewpoint of the driver of the vehicle 200 when each light is controlled to have the state shown in FIG. 7. As shown in FIG. 8, the pedestrian His about to cross a crosswalk from the right side facing the driver. The driver can visually recognize the pedestrian H. When the detection unit 120 detects that the driver has visually recognized the pedestrian H, the control unit 130 turns on the first right exterior light 40R in a first color as shown in FIG. 7. The first color may be, for example, green or another color. The control unit 130 keeps the first left exterior light 40L turned off. On the basis of a lighting signal of the first right exterior light 40R, the control unit 130 turns on a right side of the second exterior light 50 in a dogleg shape, and turns on the light so that it becomes dimmer as the left side is approached. The control unit 130 turns on only the right side of the second exterior light 50, and turns off the center and the left side. The control unit 130 turns off the headlight body 61 of the right headlight 60R and the left headlight 60L, and turns on the state display light 62. The lighting mode of each light shown in FIG. 7 is set to a second lighting mode.

As shown in FIG. 8, when the pedestrian H begins to approach near the crosswalk, the driver stops the vehicle 200 to avoid a collision and visually recognizes a direction of the pedestrian H. The detection unit 120 detects the visual recognition direction of the driver. When the detection unit 120 detects the visual recognition direction of the driver and determines that the driver is staring at the right side based on the detected visual recognition direction and an elapsed time, the control unit 130 sets the lighting mode of each light to the second lighting mode. The control unit 130 controls each light so that it is turned on in the second lighting mode, thereby conveying to the pedestrian H that the driver has visually recognized the pedestrian H, and allowing the pedestrian H to be able to feel a sense of security.

Figure 9:
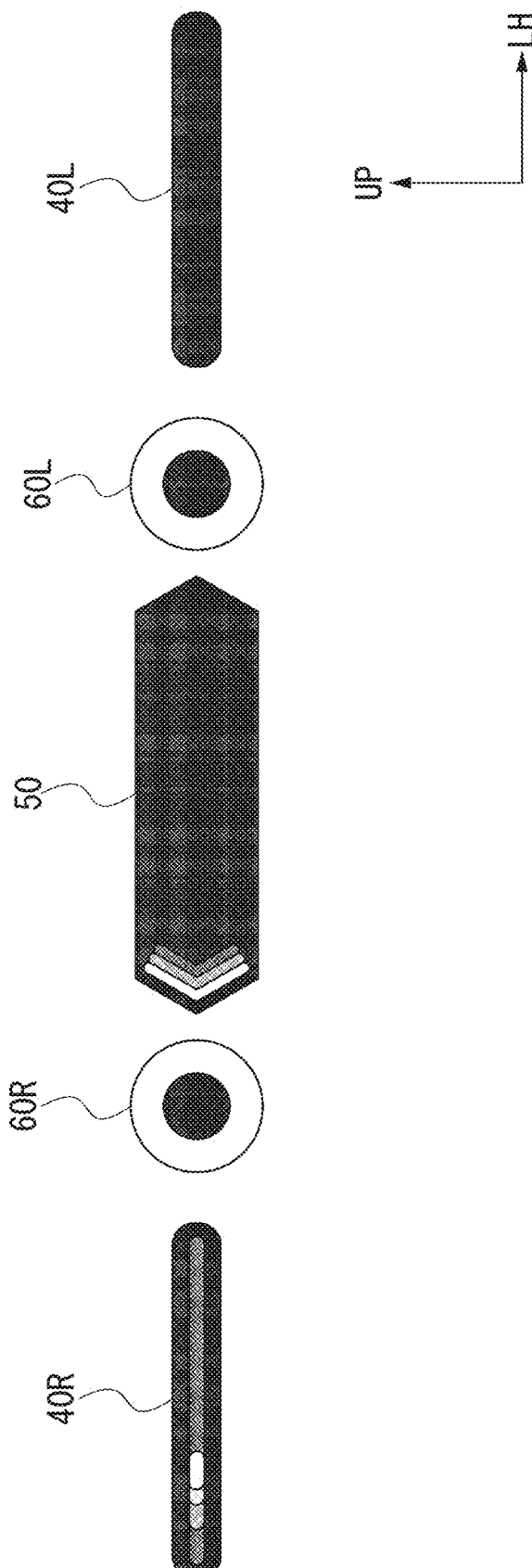
FIG. 9 is a diagram which shows an example of the lighting state of each light when a pedestrian is approaching from the right side of the vehicle.
Figure 10:
FIG. 10 is a diagram which shows an example of a pedestrian viewed from the viewpoint of the driver of the vehicle when each light is controlled to have the state shown in FIG. 9.

FIG. 9 is a diagram which shows an example of the lighting state of each light when the pedestrian H is approaching from the right side of the vehicle 200. FIG. 10 is a diagram which shows an example of the pedestrian H viewed from the viewpoint of the driver of the vehicle 200 when each light is controlled in the state shown in FIG. 9. As shown in FIG. 10, the pedestrian His walking on the crosswalk on the right side facing the driver, and has moved forward further than at a time of FIG. 8. By moving forward, the pedestrian His walking closer to the vehicle 200. As shown in FIG. 9, the control unit 130 turns on the light so that a second color moves from the right to the left while turning on the first right exterior light 40R in the first color. The second color may be, for example, white or another color, and is a color different from the first color. The control unit 130 keeps the second exterior light 50 turned on in the same state as the second exterior light 50 in FIG. 8. The control unit 130 keeps the headlight body 61 turned off and keeps the state display light 62 turned on as in FIG. 8 for the right headlight 60R and the left headlight 60L. The lighting mode of each light shown in FIG. 9 is a third lighting mode.

The driver continues to gaze at the pedestrian H walking on the crosswalk. The visual recognition direction of the driver moves to the left as the pedestrian H moves forward. For example, when the detection unit 120 detects that the driver has gazed at the pedestrian H for 1 to 2 seconds, the control unit 130 turns on the first right exterior light 40R in the second color, and turns it on to follow the visual recognition direction of the driver. For example, the second color gradually moves to the left, and areas turned on are dimmed out. The control unit 130 turns on the dimmed areas in the first color.

By performing control so that each light is turned on in the third lighting mode, the control unit 130 can convey to the pedestrian H that the visual recognition direction of the driver is following the pedestrian H, and allow the pedestrian H to be able to feel the sense of security.

Figure 11:
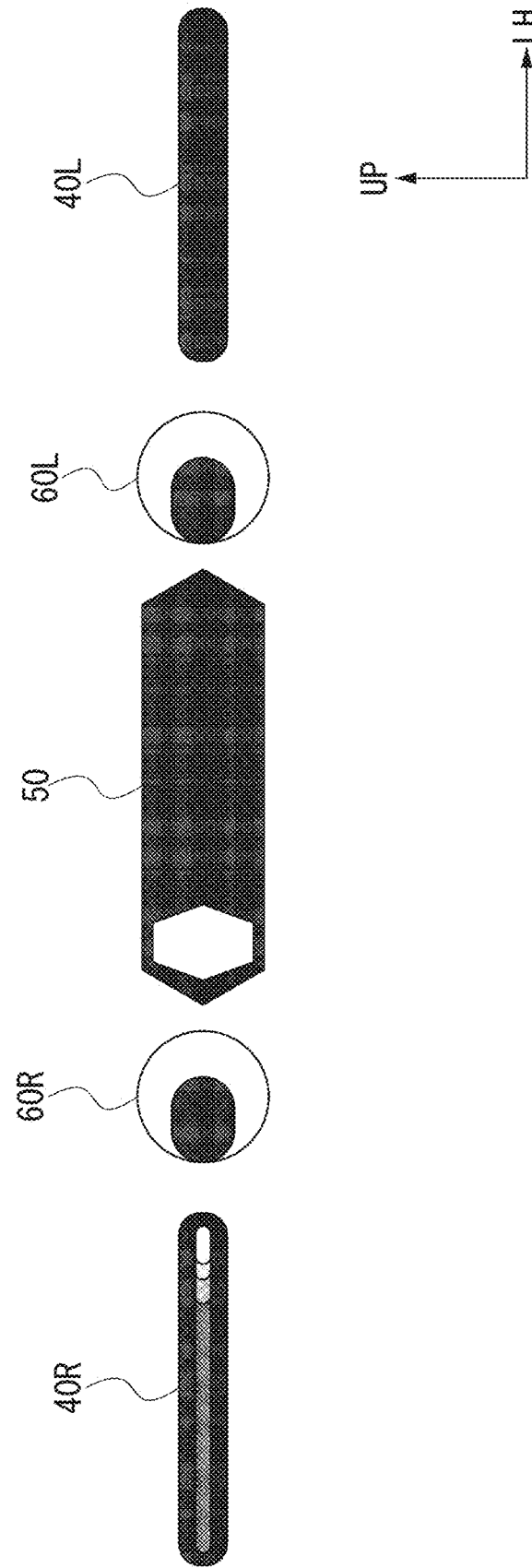
FIG. 11 is a diagram which shows an example of the lighting state of each light when a pedestrian is approaching a front right side of the vehicle.
Figure 12:
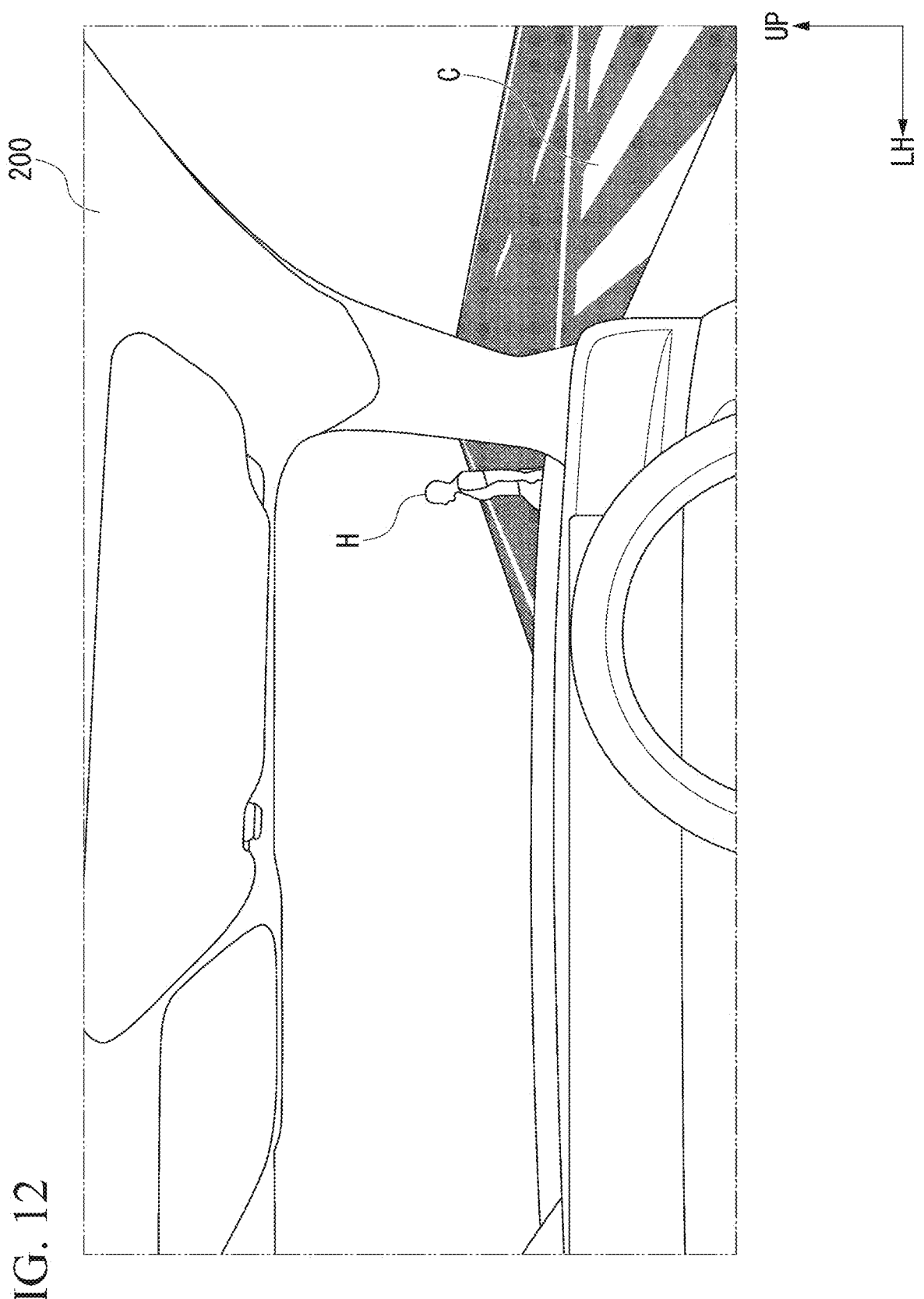
FIG. 12 is a diagram which shows an example of a pedestrian viewed from the viewpoint of the driver of the vehicle when each light is controlled to have the state shown in FIG. 11.

FIG. 11 is a diagram which shows an example of the lighting state of each light when the pedestrian His approaching a front right side of the vehicle 200. FIG. 12 is a diagram which shows an example of the pedestrian H viewed from the viewpoint of the driver of the vehicle 200 when each light is controlled to have the state shown in FIG. 11. As shown in FIG. 12, the pedestrian H moves forward further and walks on the crosswalk in a direction of the front right side of the vehicle 200. As shown in FIG. 11, the control unit 130 turns on the second color at the left end while turning on the first color for the first right exterior light 40R. The control unit 130 gradually dims areas where the second color is turned on and turns on only the first color for the first right exterior light 40R. The control unit 130 turns on only a right end of the second exterior light 50. A shape of the second exterior light 50 may be, for example, a hexagon as shown in FIG. 11, a human shape, or a dot. The control unit 130 turns off the headlight body 61 and the state display light 62 of the right headlight 60R and the left headlight 60L in a part on the right side, and turns on the other parts of the state display light 62. The control unit 130 turns off the first left exterior light 40L. The lighting state of each light shown in FIG. 11 is a fourth lighting mode.

As shown in FIG. 12, as the pedestrian H moves forward, the visual recognition direction of the driver gradually moves to the front of the vehicle 200. The control unit 130 controls the lighting state of each light according to the visual recognition direction, and turns on each light in the fourth lighting mode.

The control unit 130 performs control to turn on each light in the fourth lighting mode, thereby conveying to the pedestrian H that the visual recognition direction of the driver continues to follow the pedestrian H, and allowing the pedestrian H to be able to feel the sense of security.

Figure 13:
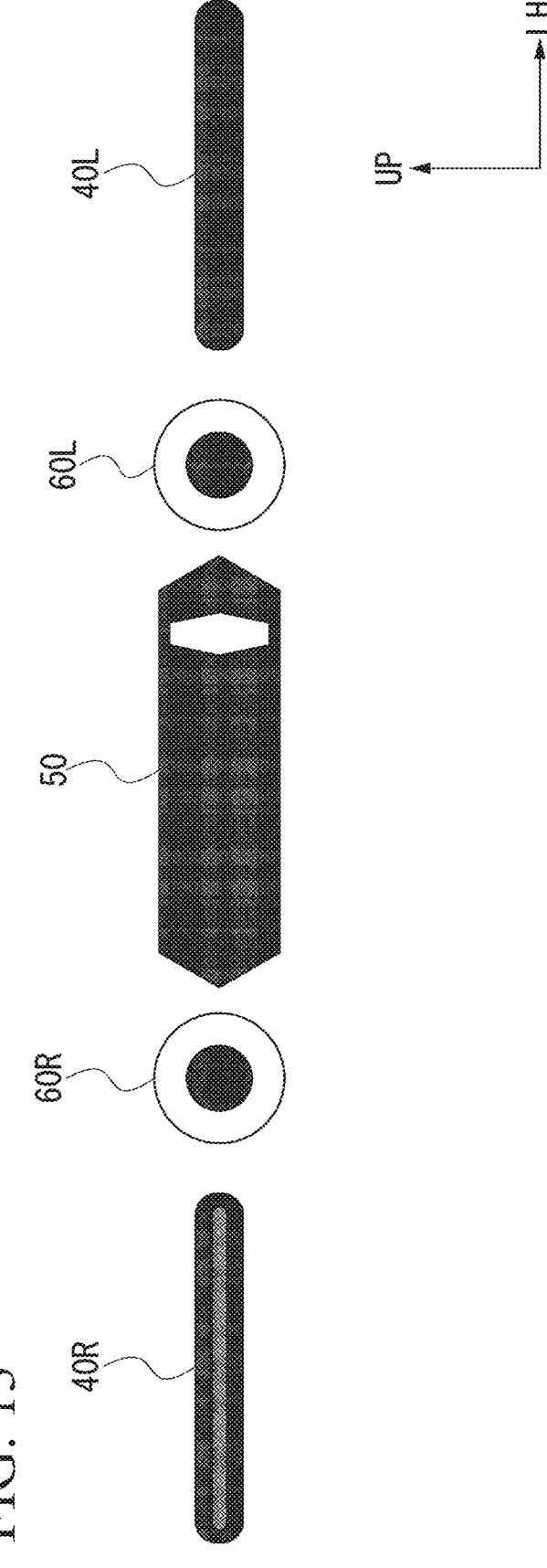
FIG. 13 is a diagram which shows an example of the lighting state of each light when a pedestrian is approaching a left side of the vehicle.
Figure 14:
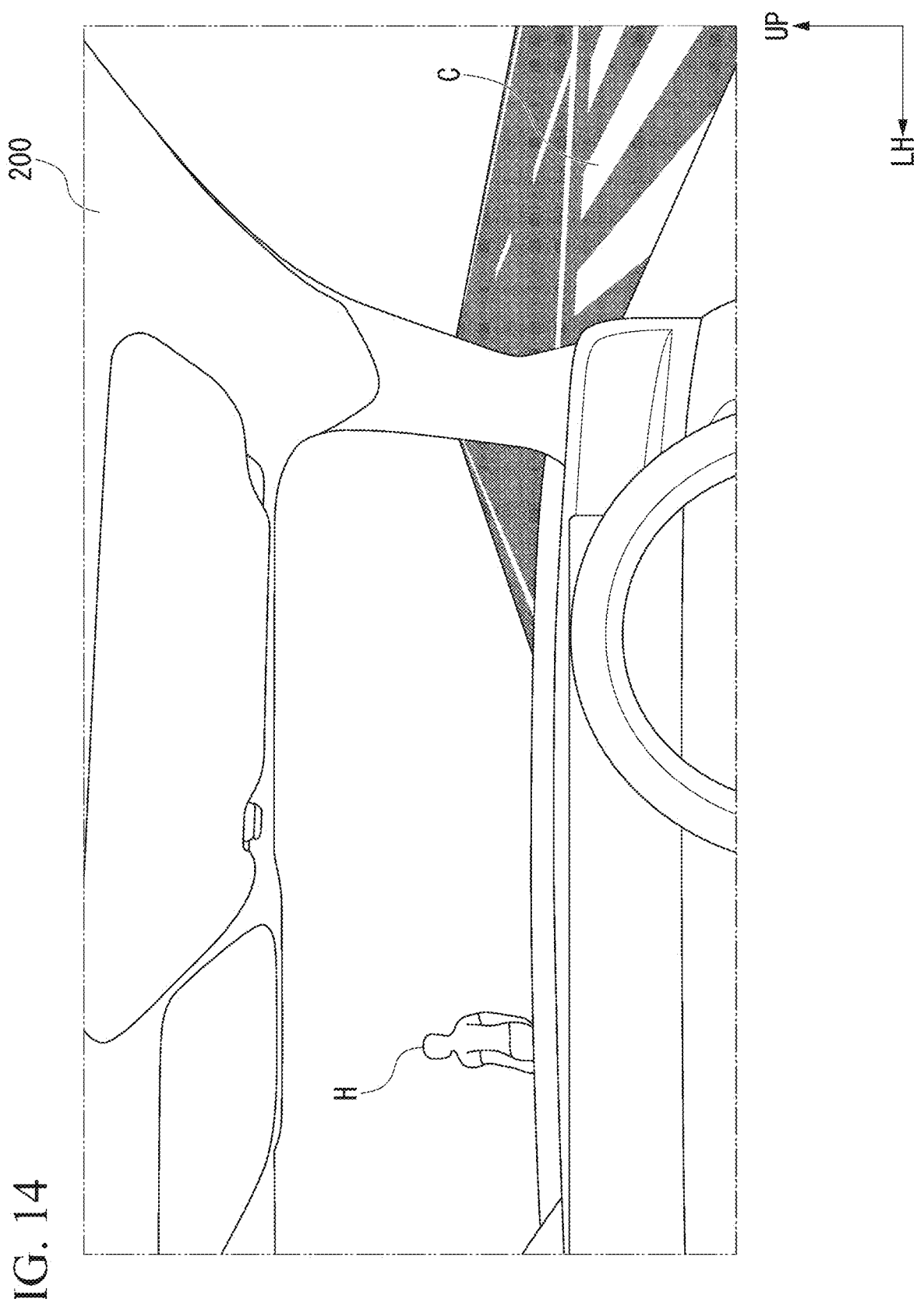
FIG. 14 is a diagram which shows an example of a pedestrian viewed from the viewpoint of the driver of the vehicle when each light is controlled to have the state of FIG. 13.

FIG. 13 is a diagram which shows an example of the lighting state of each light when the pedestrian His approaching the left side of the vehicle 200. FIG. 14 is a diagram which shows an example of the pedestrian H viewed from the viewpoint of the driver of the vehicle 200 when each light is controlled to have the state shown in FIG. 13. The pedestrian H moves forward further and walks on the left side viewed by the driver. The visual recognition direction of the driver moves to the left side. As shown in FIG. 13, the control unit 130 dims the first color of the first right exterior light 40R. The control unit 130 turns off the first left exterior light 40L. The control unit 130 turns on a left side of the second exterior light 50 in a hexagonal pattern. The control unit 130 turns off the headlight body 61 of the right headlight 60R and the left headlight 60L, and turns on only the state display light 62. The lighting state of each light shown in FIG. 13 is set to a fifth lighting state.

In FIG. 14, the pedestrian H moves to the left side, and accordingly, the visual recognition direction of the driver moves to the left, and thereby the control unit 130 performs control so that the turned-on part of the second exterior light 50 becomes a left side. Moreover, the control unit 130 also dims lighting of the first right exterior light 40R.

The control unit 130 performs control to turn on each light in the fifth lighting mode, thereby conveying to the pedestrian H that the movement of each light is following the pedestrian H as he or she moves to the left side of a road, and thus allowing the pedestrian H to be able to feel the sense of security.

Figure 15:
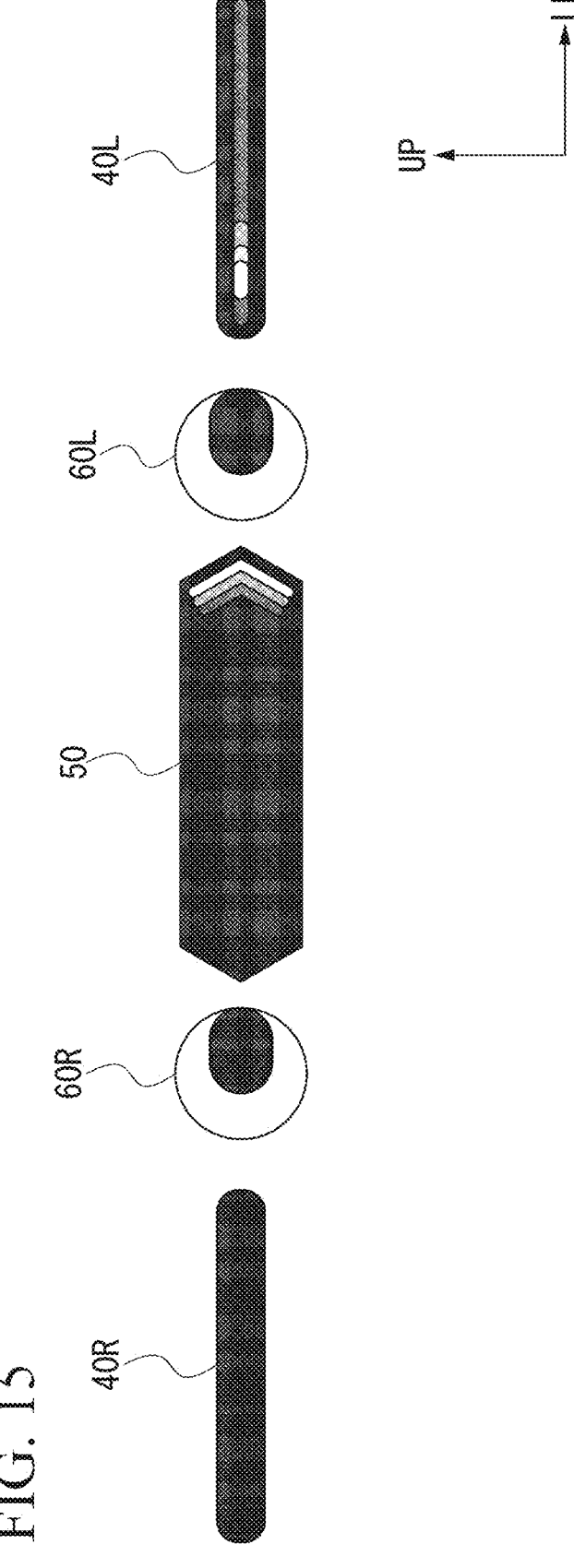
FIG. 15 is a diagram which shows an example of the lighting state of each light when a pedestrian is moving away to the left side of the vehicle.
Figure 16:
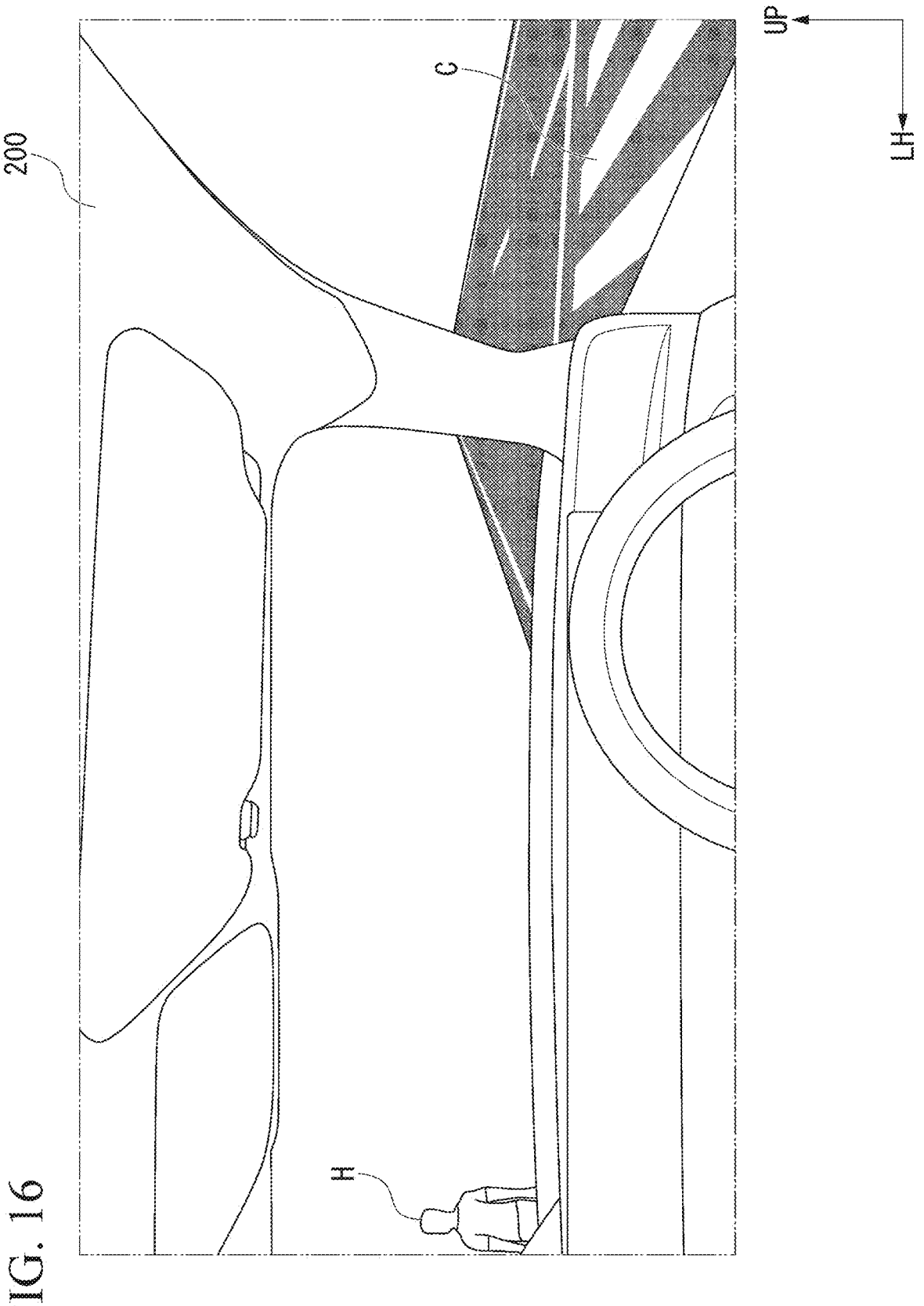
FIG. 16 is a diagram which shows an example of a pedestrian viewed from the viewpoint of the driver of the vehicle when each light is controlled to have the state of FIG. 15.

FIG. 15 is a diagram which shows an example of the lighting state of each light when the pedestrian H is moving away from the left side of the vehicle 200. FIG. 16 is a diagram which shows an example of the pedestrian H viewed from the viewpoint of the driver of the vehicle 200 when each light is controlled to have the state shown in FIG. 15. The pedestrian H continues to move forward and is about to finish crossing the crosswalk, moving away from the vehicle 200. As shown in FIG. 15, the control unit 130 turns off the first right exterior light 40R. The control unit 130 turns on the first left exterior light 40L in the first color, and turns on the second color while moving according to the movement of the pedestrian H. The control unit 130 turns on the left side of the second exterior light 50 in a dogleg shape. The control unit 130 turns off the headlight body 61 and a left side of the state display light 62 of the right headlight 60R and the left headlight 60L, and turns on the other state display lights 62. The lighting state of each light shown in FIG. 15 is a sixth lighting mode.

The control unit 130 performs control to turn on each light in the sixth lighting mode, thereby conveying to the pedestrian H that the movement of each light continues to follow the pedestrian H even when he or she is about to finish crossing the crosswalk, and thus allowing the pedestrian H to be able to feel the sense of security.

Figure 17:
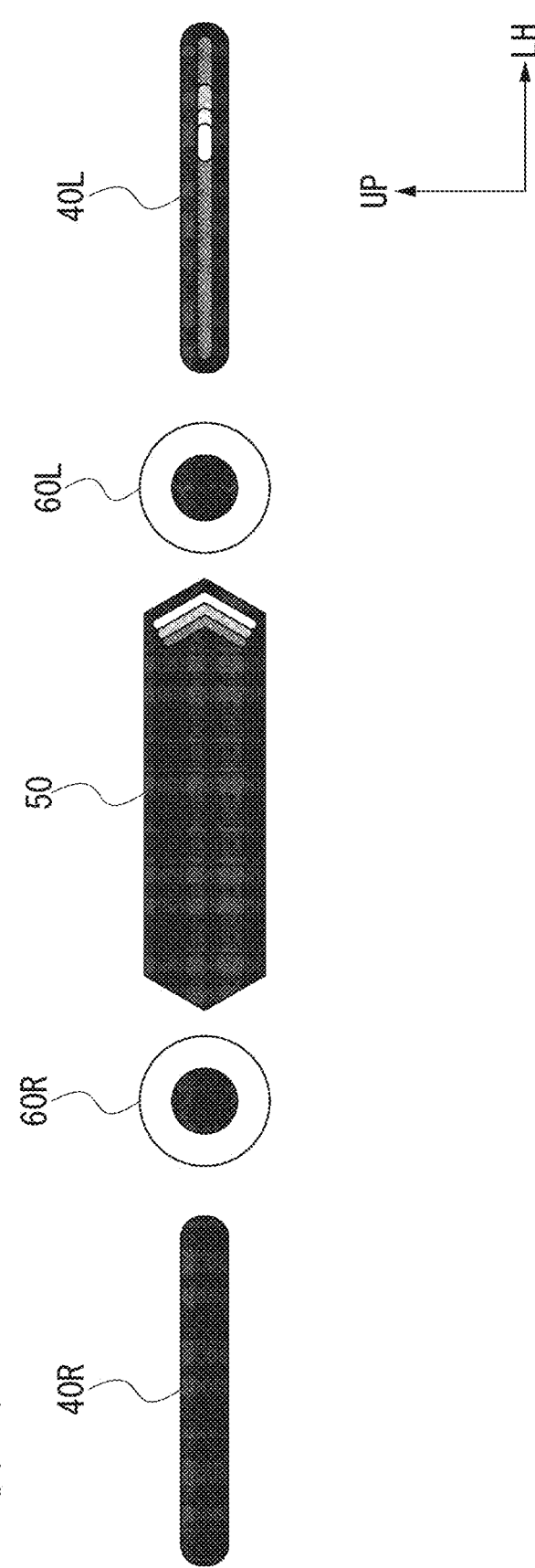
FIG. 17 is a diagram which shows an example of the lighting state of each light when a pedestrian is moving away to the left side of the vehicle.
Figure 18:
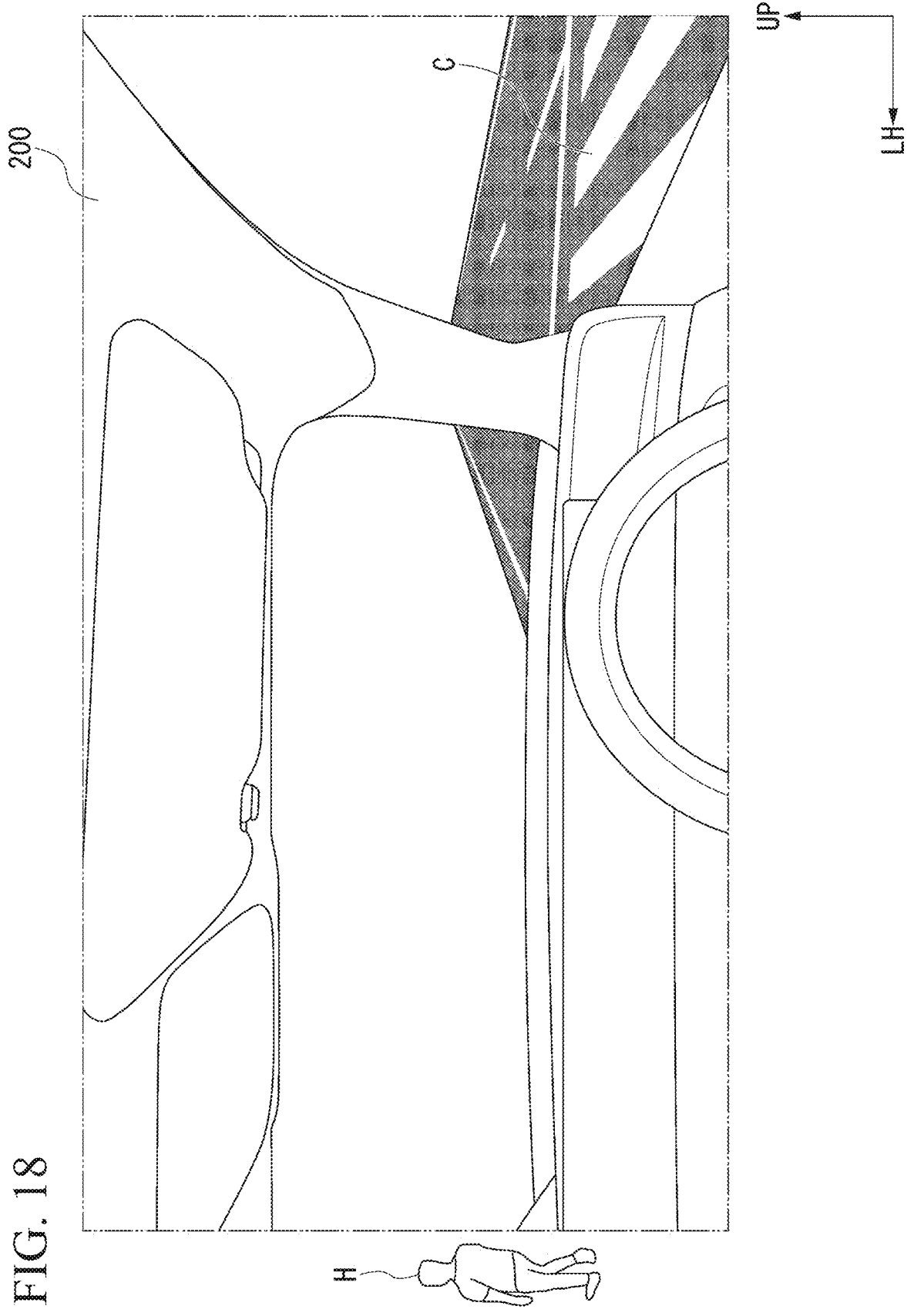
FIG. 18 is a diagram which shows an example of a pedestrian viewed from the viewpoint of the driver of the vehicle when each light is controlled to have the state of FIG. 17.

FIG. 17 is a diagram which shows an example of the lighting state of each light when the pedestrian H is moving away from the left side of the vehicle 200. FIG. 18 is a diagram which shows an example of the pedestrian H viewed from the viewpoint of the driver of the vehicle 200 when each light is controlled to have the state shown in FIG. 17. The pedestrian H moves forward further and finishes crossing the crosswalk. As shown in FIG. 17, the control unit 130 keeps the first right exterior light 40R turned off. The control unit 130 moves the second color light of the first left exterior light 40L to the left side. The control unit 130 keeps the left side of the second exterior light 50 turned on in a dogleg shape. The control unit 130 turns off the headlight body 61 of the right headlight 60R and the left headlight 60L, and turns on the state display light 62. The lighting state of each light shown in FIG. 17 is a seventh lighting state.

The driver determines that the pedestrian H has moved away and there is no longer any risk of collision, shifts the visual recognition direction back to the direction of travel, and continues driving. Each light of the vehicle lighting device 1 returns to the first lighting mode.

When the vehicle 200 stops near an intersection or a crosswalk, the recognition unit 110 recognizes an object, and the detection unit 120 detects that the visual recognition direction of the driver is toward the object, the vehicle lighting device 1 is turned on by changing from the second lighting mode to the seventh lighting mode. The vehicle lighting device 1 does not necessarily change from the first lighting mode in sequence, but rather changes the lighting mode according to the position of an object and the visual recognition direction when it is detected that the object is present near the vehicle 200 and the driver has shifted the visual recognition direction toward the object. By the vehicle lighting device 1 changing the lighting mode according to the position of an object and the visual recognition direction, the visual recognition direction of the driver can be conveyed to the outside of the vehicle 200, enabling comprehensive communication.

When there are a plurality of objects, the control unit 130 turns on a mode of emphasizing each of the objects that has a higher danger risk to the vehicle 200. The danger risk is a risk of collision between the control unit 130 and the vehicle 200. The danger risk is calculated based on conditions such as a high overlap rate between the object and the vehicle 200, or a short distance between the object and the vehicle 200. The overlap rate is a value calculated by dividing a lateral difference between a left edge of the vehicle 200 and a center of the object by an overall width of the vehicle 200 when the vehicle 200 travels on a road.

Figure 19:
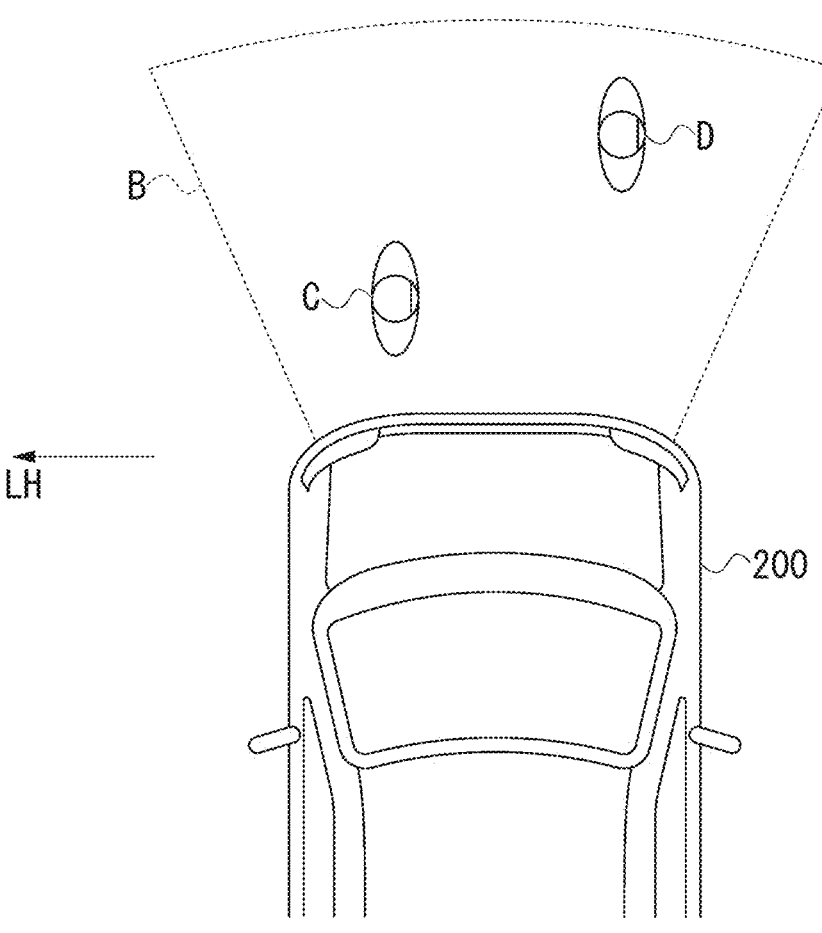
FIG. 19 is a diagram which shows an example in which a plurality of objects are present.

FIG. 19 is a diagram which shows an example of a case where there are a plurality of objects. A pedestrian C and a pedestrian D are present in the direction of travel of the vehicle 200. The pedestrian C and the pedestrian D are present within a range recognized by the external sensor 20 of the vehicle 200. The control unit 130 calculates the danger risk of each of the pedestrian C and the pedestrian D. The danger risk is calculated to be the highest when the overlap rate between the vehicle 200 and the object is the highest and the distance between the vehicle 200 and the object is the shortest. In the case of FIG. 19, the pedestrian C is calculated to have the highest danger risk.

Figure 20:
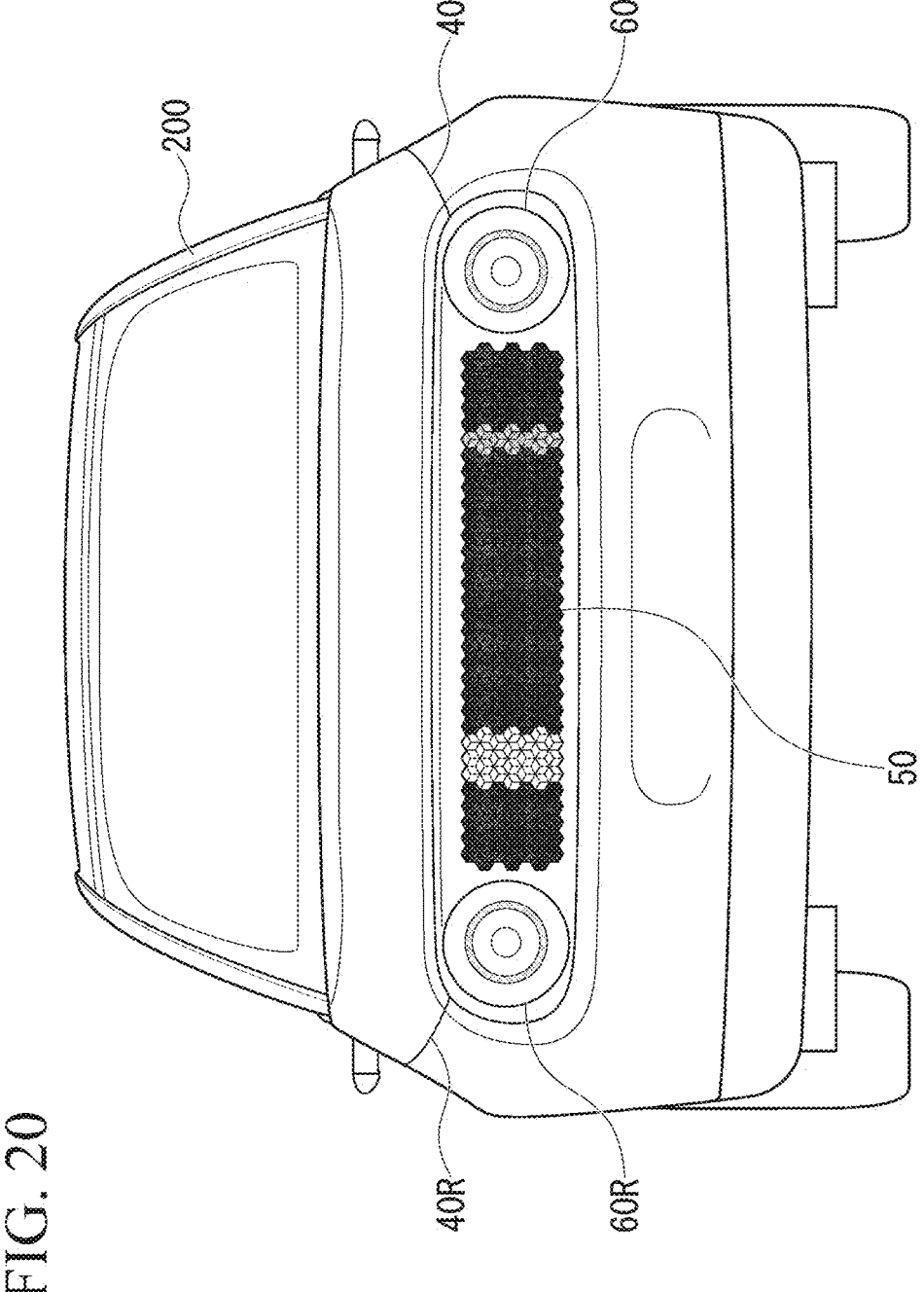
FIG. 20 is a front view of a vehicle which shows a lighting mode of a vehicle lighting device controlled in the case of FIG. 19.

FIG. 20 is a front view of the vehicle 200 indicating the lighting mode of the vehicle lighting device 1 controlled in the case of FIG. 19. The control unit 130 turns off the first right exterior light 40R and the first left exterior light 40L. The control unit 130 turns on the second exterior light 50 in a rectangular shape in areas corresponding to the pedestrian C and the pedestrian D. The control unit 130 turns on the second exterior light 50 so that the rectangle corresponding to the pedestrian C, who has a higher danger risk, is darker, and the rectangle corresponding to the pedestrian D, who has a lower danger risk, is lighter. The control unit 130 turns off the headlight body 61 of the right headlight 60R and the left headlight 60L, and turns on the state display light 62.

The control unit 130 controls the position of the second exterior light 50 to be turned on according to a positional relationship of an object, and controls the lighting mode according to a danger risk of the object.

Figure 21:
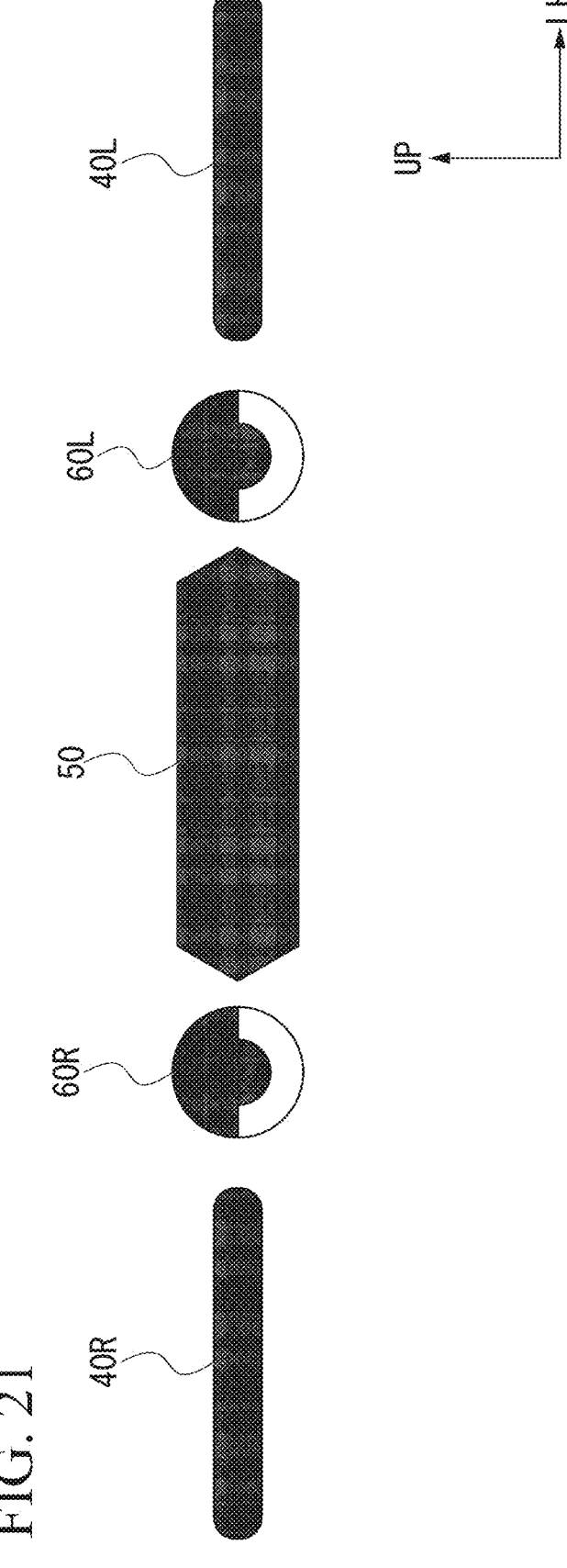
FIG. 21 is a diagram which shows an example of the lighting mode of the vehicle lighting device when a vehicle is stopped.

FIG. 21 is a diagram which shows an example of the lighting mode of the vehicle lighting device 1 when the vehicle 200 is stopped. "Stopped" means that the vehicle 200 is stopped at less than a predetermined speed. When the vehicle 200 is stopped, the control unit 130 turns off the first right exterior light 40R, the first left exterior light 40L, and the second exterior light 50. The control unit 130 turns on only a lower half of the state display light 62 of the right headlight 60R and the left headlight 60L, and turns off the other parts. The lighting mode shown in FIG. 21 is set to an eighth lighting mode.

Figure 22:
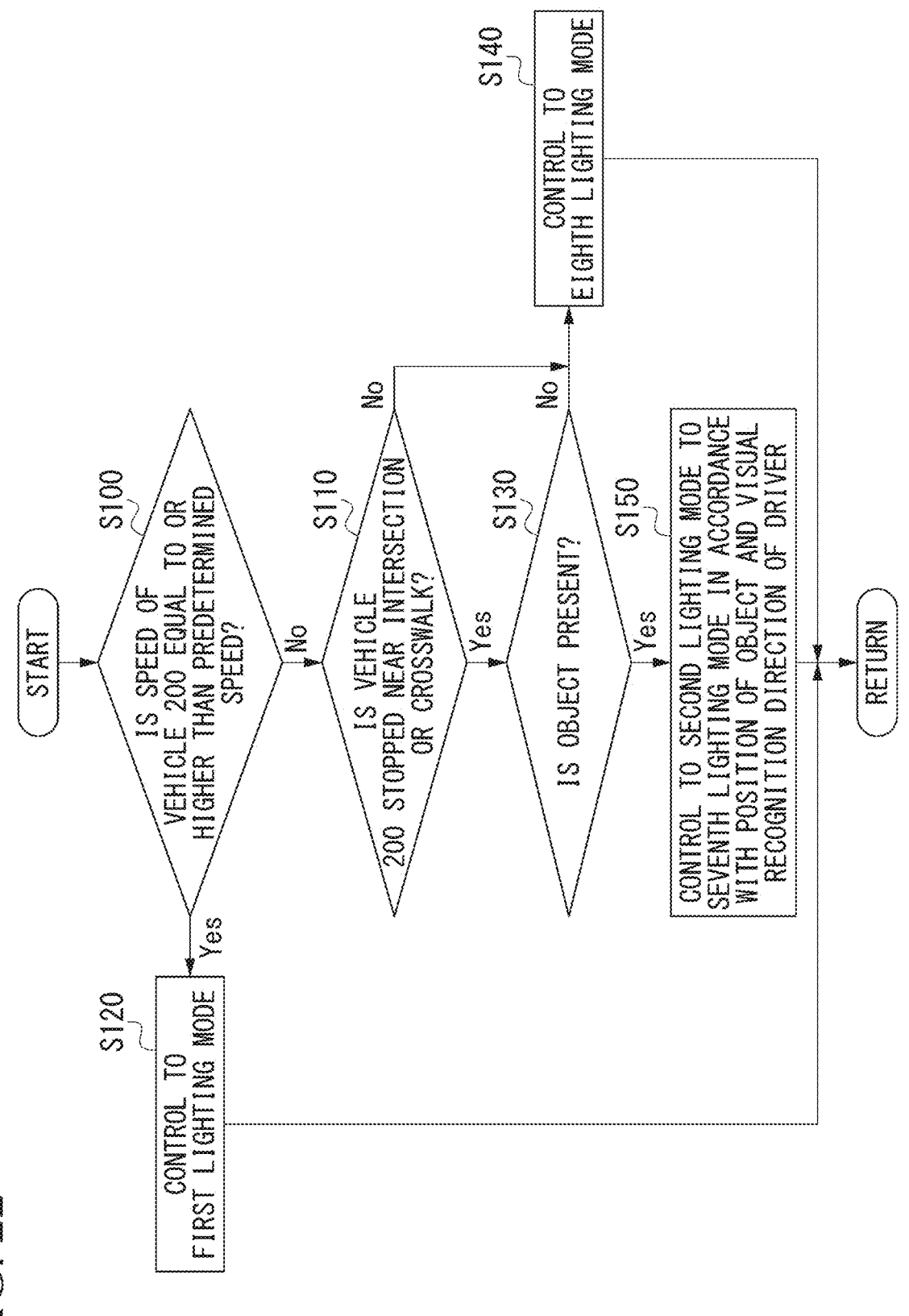
FIG. 22 is a flowchart which shows an example of an operation of a second exterior light.

FIG. 22 is a flowchart which shows an example of an operation of the second exterior light 50. Processing of this flowchart is executed repeatedly at, for example, a predetermined cycle. In the flowchart of FIG. 22, it is assumed that there is one object.

First, the control unit 130 determines whether the vehicle speed of the vehicle 200 is equal to or higher than a predetermined speed (step S100). The predetermined speed is, for example, a value of about 1 km/h, and is a value for determining whether the vehicle 200 is stopped or in a state close to being stopped.

When the vehicle 200 is traveling at or above the predetermined speed, the control unit 130 controls the second exterior light 50 to the first lighting mode (step S120).

When the vehicle 200 is traveling below the predetermined speed, the control unit 130 determines whether the vehicle 200 is near an intersection or a crosswalk (step S110).

When the processing of step S110 determines that the vehicle 200 is stopped near an intersection or a crosswalk (that is, the vehicle 200 is near an intersection or a crosswalk in a state close to being stopped), the recognition unit 110 determines whether an object is present (step S130).

When an object is not present, the control unit 130 controls the second exterior light 50 to the eighth lighting mode (step S140).

When an object is present, the control unit 130 controls the second exterior light 50 from the second lighting mode to the seventh lighting mode according to the visual recognition direction of the driver and the position of the object (step S150).

According to the embodiment described above, by controlling each light according to the position of an object and the visual recognition direction of a driver, it is possible to achieve comprehensive communication between other parties, and to contribute to a development of a sustainable transportation system by further improving traffic safety for vehicles and other parties.

The embodiment described above can be expressed as follows.

A vehicle lighting device includes a storage medium that stores computer-readable instructions, a first exterior light that is provided on an exterior portion of a vehicle, a second exterior light that is provided on the exterior portion of the vehicle, and one or more processors that are connected to the storage medium, wherein the one or more processors execute the computer-readable instructions to execute processing of recognizing an object present on a travel route of the vehicle, processing of detecting a visual recognition direction of a driver of the vehicle, and processing of operating the second exterior light when the object is recognized, and operating the first exterior light according to the visual recognition direction detected by the detection unit.

Although a form for implementing the present invention has been described using the embodiment, the present invention is not limited to such an embodiment, and various modifications and substitutions can be made within a range not departing from the gist of the present invention. It is desirable to prohibit the vehicle 200 from moving forward (moving in a direction approaching an object) between the second lighting mode and the seventh lighting mode. In addition, sound effects and voices may be linked using an external speaker (not shown) in accordance with the second lighting mode to the seventh lighting mode.

What is claimed is:

1. A vehicle lighting device comprising:
a pair of headlights that illuminate an area in front of a vehicle;
a first exterior light that is provided along an outer edge of a side of an exterior portion of the vehicle, the first exterior light being different from the headlights;
a second exterior light that is provided on the exterior portion of the vehicle at a front of the vehicle in a vehicle width direction between the pair of headlights, the second exterior light being different from the headlights;
a recognition unit configured to recognize an object present on a travel route of the vehicle;
a detection unit configured to detect a visual recognition direction of a driver of the vehicle; and
a control unit configured to operate the second exterior light in a state where the headlights are turned on or turned off when the object is recognized by the recognition unit, and to operate the first exterior light according to the visual recognition direction detected by the detection unit.

2. The vehicle lighting device according to claim 1, wherein the control unit operates the second exterior light when the vehicle stops in front of an intersection or a crosswalk, and the recognition unit recognizes the object, and operates the first exterior light according to the visual recognition direction detected by the detection unit.

3. The vehicle lighting device according to claim 1, wherein the first exterior light is provided on a fender, and the second exterior light is provided in a grill.

4. The vehicle lighting device according to claim 1, wherein the control unit turns on the second exterior light to follow the object.

5. The vehicle lighting device according to claim 1, wherein the control unit turns on positions of the second exterior light corresponding to a plurality of objects when the plurality of objects are recognized.

6. The vehicle lighting device according to claim 1, wherein when the recognition unit recognizes a plurality of objects, the control unit turns on the second exterior light in areas corresponding to the plurality of objects.

7. A vehicle lighting control method executed by a processor of a vehicle lighting device that comprises a pair of headlights that illuminate an area in front of a vehicle, a first exterior light provided along an outer edge of a side of an exterior portion of the vehicle, the first exterior light being different from the headlights, and a second exterior light provided on the exterior portion of the vehicle at a front of the vehicle in a vehicle width direction between the pair of headlights, the second exterior light being different from the headlights, the method comprising:
processing of recognizing an object present on a travel route of the vehicle;

processing of detecting a visual recognition direction of a driver of the vehicle; and processing of operating the second exterior light in a state where the headlights are turned on or turned off when the object is recognized and operating the first exterior light according to the detected visual recognition direction.

8. A non-transitory computer storage medium that has stored a program for causing a processor of a vehicle lighting device that comprises a pair of headlights that illuminate an area in front of a vehicle, a first exterior light provided along an outer edge of a side of an exterior portion of the vehicle, the first exterior light being different from the headlights, and a second exterior light provided on the exterior portion of the vehicle at a front of the vehicle in a vehicle width direction between the pair of headlights, the second exterior light being different from the headlights, to execute:

processing of recognizing an object present on a travel route of the vehicle;

processing of detecting a visual recognition direction of a driver of the vehicle; and processing of operating the second exterior light in a state where the headlights are turned on or turned off when the object is recognized and operating the first exterior light according to the detected visual recognition direction.

\* \* \* \* \*